United States Patent [19]

Drumm et al.

[11] Patent Number: 5,003,487
[45] Date of Patent: Mar. 26, 1991

[54] METHOD AND APPARATUS FOR PERFORMING TIMING CORRECTION TRANSFORMATIONS ON A TECHNOLOGY-INDEPENDENT LOGIC MODEL DURING LOGIC SYNTHESIS

[75] Inventors: Anthony D. Drumm, Endwell, N.Y.; Randall C. Itskin, Rochester, Minn.; Kenneth W. Todd, Owego, N.Y.

[73] Assignee: International Business Machines Corporation, Armonk, N.Y.

[21] Appl. No.: 212,529

[22] Filed: Jun. 28, 1988

[51] Int. Cl.⁵ .............................. G06F 15/60
[52] U.S. Cl. ................................ 364/489; 364/488
[58] Field of Search .............. 264/488, 489, 490, 491, 264/300

[56] References Cited

U.S. PATENT DOCUMENTS

| | | | |
|---|---|---|---|
| 4,263,651 | 4/1981 | Donath et al. | 364/491 |
| 4,484,292 | 11/1984 | Hong et al. | 364/491 |
| 4,612,618 | 9/1986 | Pryor et al. | 364/490 |
| 4,656,592 | 4/1987 | Spaanenburg et al. | 364/490 |
| 4,697,241 | 9/1987 | Lavi | 364/488 |
| 4,698,760 | 10/1987 | Lembach et al. | 364/490 |
| 4,703,435 | 10/1987 | Darringer et al. | 364/489 |
| 4,827,428 | 5/1989 | Dunlop et al. | 364/491 |

OTHER PUBLICATIONS

"Diverse Design Tools Break into Logic Synthesis Arena", Computer Design, pp. 20 and 21, Oct. 15, 1987.
"Incremental Logic Synthesis Through Gate Logic Structure Identification", by T. Shinsha et al., IEEE 23rd Design Automation Conf., pp. 391–397, 1986.
"Timing Analysis for nMOS VLSI", by N. P. Jouppi, IEEE 20th Design Automation Conference, pp. 411–418, 1983.
"Optimization of Digital MOS VLSI Circuit", by M. D. Matson, Proc. Chapel Hill Conf., on VLSI, pp. 109–126, May 1985.

Primary Examiner—Parshotam S. Lall
Assistant Examiner—V. N. Trans
Attorney, Agent, or Firm—Milde & Robinson

[57] ABSTRACT

A computer program is disclosed providing a sequence of automated logic synthesis routines having three phases. Phase I identifies an estimated critical path by assuming optimum allocation within a "best-fit" preliminary assignment of the technology to a technology-independent model, and optimizes the estimated model for speed. Phase II provides a technology-legal model, and ends by calculating the actual timing provided by the technology-legal model. Phase III uses self-limiting routines, and routines that are unlikely to produce technology violations, to fine tune the production and performance characteristics of the legal model.

8 Claims, 8 Drawing Sheets

○ RE-ESTIMATE LOCAL SLACKS

○ RECALCULATE LOCAL SLACKS

METHOD AND APPARATUS FOR PERFORMING TIMING CORRECTION TRANSFORMATIONS ON A TECHNOLOGY-INDEPENDENT LOGIC MODEL DURING LOGIC SYNTHESIS

BACKGROUND OF THE INVENTION

1. Field of the Invention

This invention is directed to logic design. More particularly, this invention is directed to correcting timing problems encountered when rules for a given technology are assigned to a technology-independent logic model.

2. Discussion of Related Art

Automation of the mapping and optimization of logic data arrays for a given technology can provide savings in design time and significant improvement in the performance of the circuits produced. The possibility of automating the translation of a functional specification into its hardware implementation has long been the subject of investigation. The complexity of this task and the potential value of its automation have continued to grow with the increasing complexity of the devices being designed and the mounting pressure to shorten machine design times.

Early attempts at automated logic synthesis concentrated on deriving a minimized Boolean expression for reducing the number of gates in the functional specification. More recent efforts have provided technology-specific designs and, as the technologies become increasingly sophisticated, synthesis systems are compelled to deal with a growing number of technology-specific criteria in order to achieve acceptable implementation. Gate count continues to be a major factor in design acceptability but timing constraints and the efficient use of primitives available in the particular technology are increasingly important.

The logic synthesis procedure for implementing a model in a given technology generally begins by performing logic reduction transformations on a technology-independent model, such as the Boolean transformations mentioned earlier. Subsequent transformations, to implement timing criteria and other technology-specific features required of the model, are then performed on a technology-legal model, after mapping the technology onto the model.

Timing can be optimized by analyzing path delays, as disclosed in U.S. Pat. No. 4,263,651 issued Apr. 21, 1981 to Donath et al. and commonly assigned. However, this analysis calculates timing data for the entire model. Once any timing corrections have been made, the timing data thus calculated is not up to date. Any further timing corrections may be erroneous unless the timing data for the model is recalculated. However, the size of the logic arrays required in the present state of technology has grown to a point where this kind of brute force recalculation imposes a severe penalty on the efficiency of the design process.

A logic synthesis method which maximizes the use of primitives specific to the technology in order to minimize gate count is disclosed in U.S. Pat. No. 4,703,435, issued Oct. 7, 1987 to Darringer et al. and commonly assigned. This known method reduces the number of logic blocks in a technology-independent model, limits fan-in, and maximizes the use of negative logic NAND and NOR gates in that model before mapping the given technology to the model. This preliminary model can be modified to maximize either size or speed before the technology is mapped to it, but timing constraints are not implemented until after a technology-legal "hardware" model has been defined.

However some transformations cannot be used to correct the initial allocation of the technology to the blocks of the model. Permitting these transforms to produce violations of the technology rules at this late stage, in an otherwise technology-legal model, would disrupt the logic synthesis process. Thus the hardware model produced by this method may be unable to satisfy the required timing constraints, requiring a repeat of the logic synthesis process before achieving the required hardware implementation of a technology-independent model. Furthermore, this method provides less control over the size of the resulting technology-legal model, producing cell counts that are apt to be about 30% higher than those produced in accordance with the present invention.

A method of optimizing timing by allocating selectable power levels within a given device allocation is disclosed in U.S. Pat. No. 4,698,760 issued Oct. 6, 1987 to Lembach et al. and commonly assigned. However, this method cannot exploit the advantages that may be available if higher-powered devices are substituted for the devices assigned by the initial device allocation. Instead, it relies on the variability of the power/performance characteristics of the devices themselves.

SUMMARY OF THE INVENTION

It is an object of the present invention to prevent the technology-legal model produced by mapping a given technology onto a technology-independent model from exceeding the limits within which timing correction transformations can bring the technology-legal model into conformity with predetermined timing constraints.

It is a further object of the present invention to reduce the complexity of timing correction algorithms, and thus their execution time, while increasing their effectiveness for producing a usable, technology-legal model.

It is a further object of the present invention to provide a systematic preliminary expansion of the technology-independent model to a technology-legal model in a manner consistent with predetermined timing requirements. This expansion uses the relative timing of the data paths through the gate array that are calculated on the basis of nominative values for gate loading to simplify preliminary analysis. This is particularly important for a technology such as CMOS that has a high sensitivity to load capacitances. A fan-out load in the technology-independent model that is atypical for this technology will produce aberrant critical path analysis.

It is a further purpose of this invention to simplify preliminary critical path analysis by selecting devices that are supported by the given technology on a best fit basis to replace blocks that are inoperative in that technology.

In accordance with the present invention, a method and apparatus are provided whereby logic blocks in a technology-independent model that cannot be implemented in the given technology are identified and devices supported by the given technology are substituted for the logic blocks that cannot be implemented on a best-fit basis. Timing values of the critical path through the model are also estimated using device delay times that are limited to delay times that are consistant with optimum device allocation in the given technology.

Timing correction transformations are performed on this model to assure that it is consistant with the timing constraints imposed on the model before the rules of the given technology are fully assigned to the model.

The present invention thus provides a technology-legal model without producing uncorrectable timing problems in the process of mapping the given technology to the technology independent model.

BRIEF DESCRIPTION OF THE DRAWINGS

The particular features and advantages of the present invention will be more clearly understood when the detailed description of the preferred embodiment given below is considered in conjunction with the drawings, in which.

DETAILED DESCRIPTION OF THE PREFERRED EMBODIMENT

Figure 1:
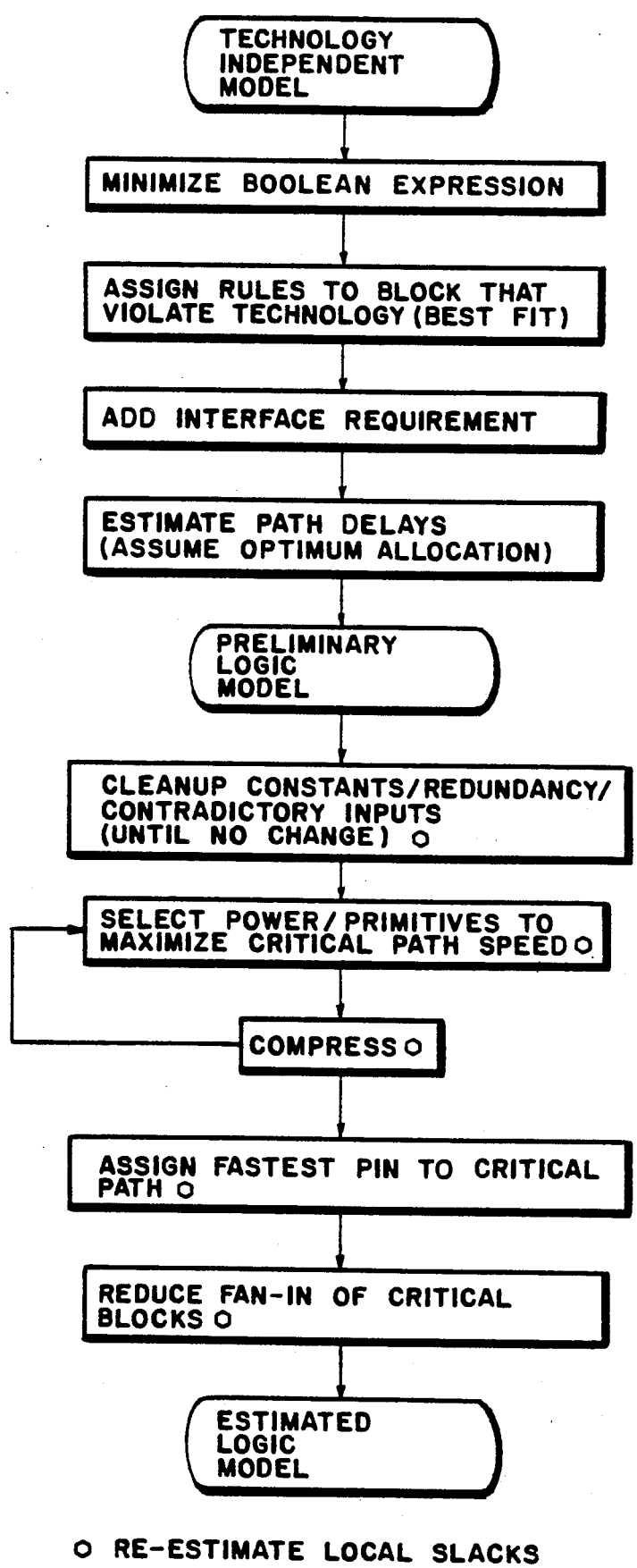
FIG. 1 is a schematic flow chart of Phase I of a logic synthesis method in accordance with a preferred embodiment of the present invention.
Figure 2:
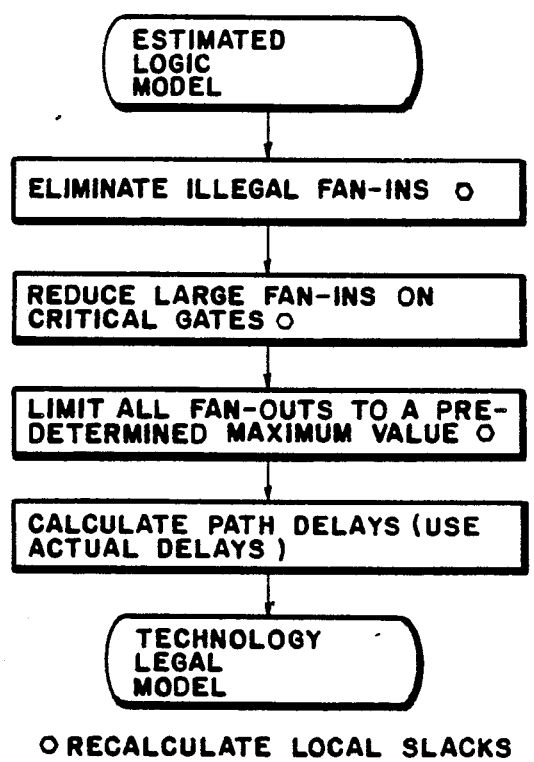
FIG. 2 is a schematic flow chart of Phase II of the logic synthesis method in accordance with the preferred embodiment of the present invention.
Figure 3:
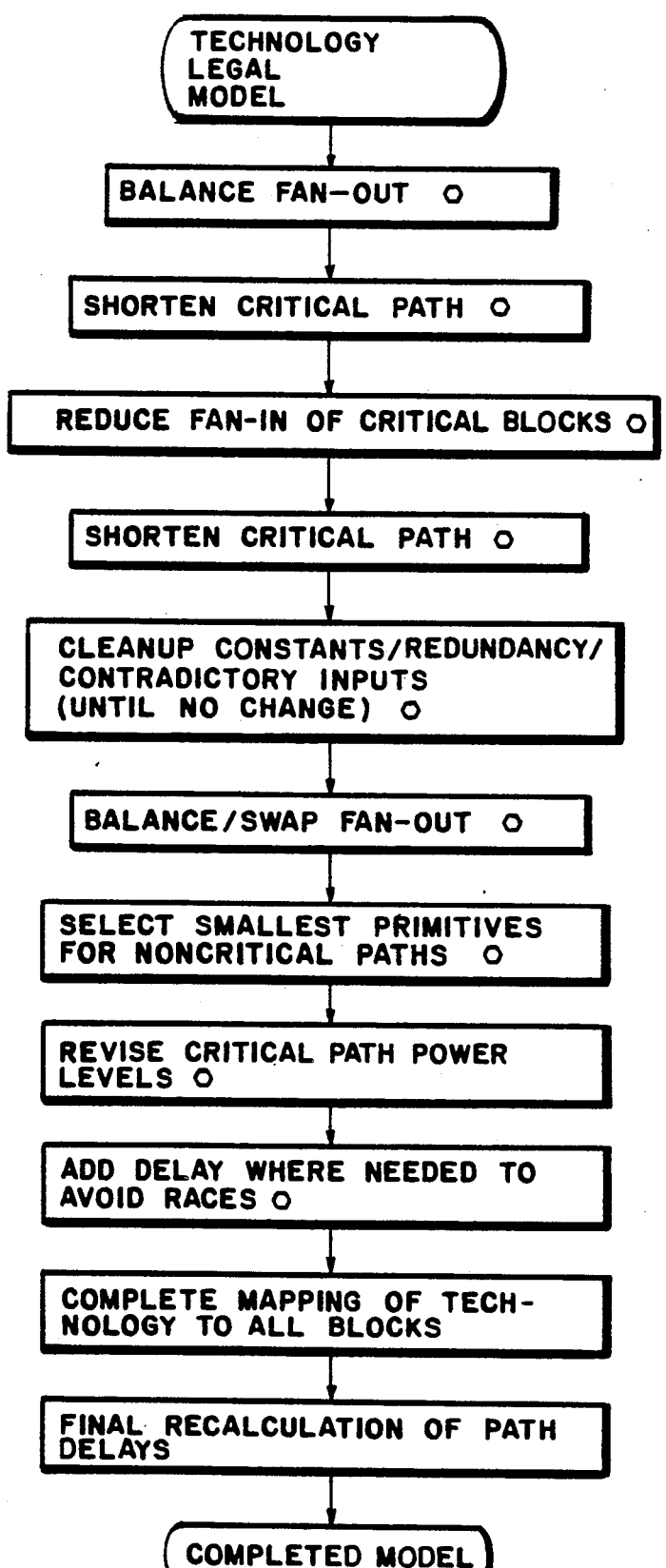
FIG. 3 is a schematic flow chart of Phase III of the logic synthesis method in accordance with the preferred embodiment of the present invention.

The logic synthesis method according to a preferred embodiment of the present invention is generally illustrated in FIGS. 1 through 3. Previous publications describing some aspects of the system according to this invention, all of which are incorporated herein by reference are: J. A. Darringer, Daniel Brand, J. V. Gerbi, W. H. Joiner, Jr., and Louise Trevillyan, "LSS: A System for Production Logic Synthesis," *IBM Journal of Research and Development*, Volume 28, No. 5, September 1984, pp 537-545; W. H. Joiner, Jr., L. H. Trevillyan, Daniel Brand, T. A. Nix, and S. C. Gundersen, "Technology Adaptation in Logic Synthesis," *Proceedings of the IEEE 23rd Design Automation Conference* (1986), pp 94-100; U.S. Pat. No. 4,698,760 issued to Lembach et al. on Oct. 6, 1987; and U.S. Pat. No. 4,703,435 issued to Darringer et al. on Oct. 27, 1987.

The method according to this present invention comprises computer programs operating on a representation of the technology-independent model and a data management system. In accordance with the preferred embodiment of the present invention the data management system is substantially similar to that described by F. E. Allen et al. in "The Experimental Compiling System," *IBM Journal of Research and Development*, Volume 24 (1980), pp 695-713. In the preferred embodiment disclosed here, however, the basic organizational unit is referred to as a "block" and the parameters for routines called by the system are shown in parentheses.

An automated logic synthesis computer program listing for mapping complementary metal oxide semiconductor (CMOS) technology to a technology-independent model in accordance with a preferred embodiment of the present invention is shown in Table 1, below. Individual transformation routines used in this preferred embodiment are known in the art, and a listing of the code used for these routines in accordance with the preferred embodiment of the present invention is provided in the attached Appendix. These known routines are discussed below, with particular reference to the advantageous sequencing and control of the logic synthesis process that is provided in accordance with the present invention.

Phase I of the program contains two sections. In the first section of Phase I, the technology-independent model is prepared for analysis by the program. Any block in the model that violates the rules of the given technology is replaced by blocks that have characteristics which are consistant with the given technology, on a "best fit" basis, thus producing a "preliminary" model.

In the second section of Phase I, the estimated critical path in this preliminary model is then optimized for speed. FIG. 1 is a schematic flowchart of Phase I.

The delay values used to estimate path delay times and local changes in the critical path in Phase I of this preferred embodiment are limited to values that are consistant with optimum device allocation for the particular given technology. The assumption of optimum allocation used in the analysis of this preliminary "best fit" allocation of devices to the model permits a convenient calculation of estimated of critical path times that is sufficiently accurate to prevent uncorrectable timing errors but avoids the aberrant values that otherwise interfere with critical path analysis in such a "best fit" mapping of the technology.

The two technology violations of greatest significance are:

Fan-in violations, in which the number of inputs to a block is greater than what is allowed by the technology; and Fan-out violations, in which the total load on a block is greater than the maximum allowed by the technology.

Phase II corrects technology violations in the estimated model produced at the end of Phase I so that by the end of Phase II it substantially meets the legal requirements set by the given technology. Phase II of the program is schematically shown in FIG. 2.

In Phase II, local changes in critical path timing are still adjusted using the assumption of optimum device allocation. At the end of Phase II, the path delay times for the model are recalculated using the actual delay times for the devices in the technology-legal model produced in Phase II.

Phase III also has two sections. In the first section of Phase III, the technology-legal model is fine-tuned to optimize its production and performance characteristics, while satisfying the predetermined timing constraints. The scope of the timing corrections permitted in Phase III is narrowly constrained. Generally the routines used in Phase III are limited to relocating a particular connection or swapping connections, operations that are unlikely to cause fan-in violations and have minimal effects on fan-out loads. Alternatively, the routines used are self-limiting routines that do not change device allocation in the model if the change in device allocation will produce technology violations.

In the second section of Phase III, the detailed mapping of the technology to the model is completed and the actual, final timing data for the completed model is calculated and documented. FIG. 3 is a schematic flowchart of Phase III of the program.

TABLE 1

| PHASE I | PHASE II |
|---|---|
| APPLY BUILDMDL; | SET CRIT_SLACK_THRESH = 0; |
| APPLY NORMALIZ; | APPLY GTAFI; |
| APPLY TIREDUCT; | APPLY GTAFIXOR (6, 3); |
| APPLY ASGNRULE; | APPLY GTAPREDC; |
| APPLY GTACIOAD; | APPLY GTATHRSH (70, 300); |
| APPLY GTAALLOC; | APPLY GTASINVT (2); |
| APPLY GTABKPT; | APPLY GTAMINVT (2); |
| APPLY GTAINIO; | SET CRIT_SLACK_THRESH = 0; |
| APPLY GTAINMEM (1); | APPLY GTADUALR; |
| SET MAXFO 2000 | APPLY GTATHRSH (50, 300); |
| SET CRIT_SLACK_THRESH = 0; | APPLY GTAREDFO (150, 2); |
| APPLY GTCALC; | SET CRIT_SLACK_THRESH = 0; |
|  | APPLY GTAUNBUF (2); |
| REPEAT GTAPROPC, | APPLY GTAFO (2000); |
|     GTACMPRS, | SET MAXFO 999999; |
|     GTAPREDC, | APPLY GTACALC; |
|     GTAREDUN, |  |
|     GTAREDIN, |  |
|     GTAREDBY; |  |
| APPLY GTAPWRUP (1); |  |
| APPLY GTAREDFO (700, 2); |  |
| APPLY GTADUALR; |  |
| APPLY GTASINGR; |  |
| APPLY GTATHRSH (50, 500) |  |
| APPLY GTASINVT (2); |  |
| SET CRIT_SLACK_THRESH = 0; |  |
| APPLY GTCMPRS; |  |
| APPLY GTADEMOR (150, 2); |  |
| APPLY GTACMPRS; |  |
| APPLY GTATHRSH (50, 400) |  |
| APPLY GTACAND (0, 2); |  |
| SET CRIT_SLACK_THRESH = 0; |  |
| APPLY GTACMPRS; |  |
| APPLY GTABAO (3, 400); |  |
| APPLY GTATHRSH (50, 400) |  |
| APPLY GTACAO (200, 2); |  |
| SET CRIT_SLACK_THRESH = 0 |  |
| APPLY GTACMPRS; |  |
| APPLY GTATHRSH (70, 300) |  |
| APPLY GTAREGRP |  |
| APPLY GTATHRSH (100, 300) |  |
| APPLY GTAREDFI (9, 1, 150) |  |
|  | PHASE III |
|  | APPLY GTAFOBAL; |
|  | APPLY GTATHRSH (50, 100); |
|  | APPLY GTAPROMO (0, 100, 10); |
|  | APPLY GTATHRSH (50, 300); |
|  | APPLY GTAREDFI (9, 1, 150); |
|  | APPLY GTATHRSH (50, 100); |
|  | APPLY GTAPROMO (0, 100, 10); |
|  | REPEAT GTAPROPC, |
|  |     GTAREDUN, |
|  |     GTAREDIN, |
|  |     GTAREDBY; |
|  | APPLY GTATHRSH (50, 100); |
|  | APPLY GTAREGRP; |
|  | SET CRIT_SLACK_THRESH = 0; |
|  | APPLY GTAFI; |
|  | APPLY GTAFO (2000); |
|  | APPLY GTAFOBAL; |
|  | APPLY GTAUNBUF (2); |
|  | APPLY GTASIN (2); |
|  | APPLY GTACELDN; |
|  | APPLY GTAREPWR (25); |
|  | APPLY GTAUNBUF (2); |
|  | APPLY GTAFILL; |
|  | APPLY GTASLOW; |
|  | APPLY GTAFO (2000); |
|  | APPLY RCHTOTEC; |
|  | APPLY GTACALC; |
|  | APPLY GTAHISTO; |
|  | APPLY GTASLIST; |
|  | APPLY GTACIODE; |
|  | END |

Phase I begins with the instruction APPLY BUILDMDL, which reads a technology-independent model into the processor. Next, the routine NOR MALIZ accepts any one of several standard types of model notation and conforms it to the format required for the logic synthesis process in this program. The routine TIREDUCT reduces the technology-independent model to its minimal Boolean expression.

ASGNRULE assigns technology-specific delay values to each block. Each block is initially assigned the delay values produced by the lowest power level used by the technology allocated to that block. This is later adjusted by GTAPWRUP and GTAREPWR. The delay values provided by ASGNRULE are subsequently used by GTACALC to define an actual arrival time for each output pin in the model and an expected arrival time for each input pin.

ASGNRULE assigns delay values on a "best fit" basis. Thus, blocks whose fan-in or fan-out requirements exceed the fan-in available in the given technology, blocks that violate the "rules" of that technology, are assigned the delay values of the block in the given technology that has the greatest fan-in capacity. If five inputs is the maximum fan-in supported in the given technology, the delay values for the block having five inputs are assigned to blocks having more than that maximum number of inputs.

Each block in the technology-independent model generally has input and output terminals which connect the block to other blocks. ASGNRULE generally treats the delay through the block, between any pair of these pins, as a single value for that block. However, the ASGNRULE routine assigns specific delay adjustment value to the pin connections on blocks having delay times that vary greatly from pin to pin, such as AND-OR blocks in CMOS technology. These blocks are reviewed again, later in the program, by the GTAREGRP routine, to increase the speed of critical paths by swapping pin connections on these blocks.

The specific delay adjustment value for each input and for each output of a block is added to the average delay between the inputs and outputs of the block to provide an estimate of the delay for each path through these blocks. This avoids storing the path delays for every possible combination of inputs and outputs, but it also avoids the inaccuracies resulting from using a flat average delay for these particular blocks.

GTABKPT, GTAINIO, and GTAINMEM add interface design criteria to the technology-independent model. These external criteria determine the performance required of the model. Each model has one or more primary blocks to which GTAINIO assigns interface timing data. These primary blocks can have only an output or an input, respectively. Thus, before GTAINIO can assign timing delay data to a model, a dummy block must be added for each bi-directional pin defined in the model. This is done by the GTACIOAD routine.

Figure 4:
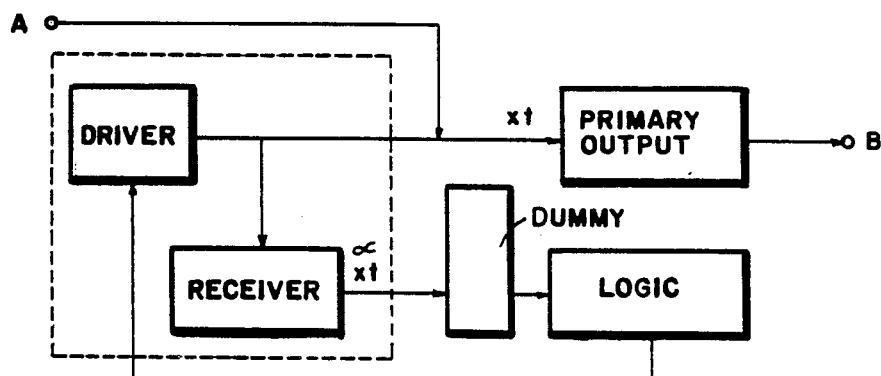
FIG. 4 illustrates the allocation of timing data associated with a bi-directional pin.

The GTAINIO routine then assigns the actual arrival time data and input delay data for the bi-directional pin to the dummy device, which becomes the primary input block but is also in series with the output of the model, as shown in FIG. 4. The output delay is attributed to the transceiver on the bi-directional pin and the expected time is attributed to the input to the primary output block.

SET MAXFO and SET CRIT SLACK THRESH establish parameters for identifying the estimated critical path that will be optimized for speed in the second section of Phase I. The instruction SET MAXFO 2000 replaces all fan-out load values in the preliminary model that exceed a maximum value of $2000 \times 0.001$ picofarads with that maximum permissible value. The instruction SET CRIT_SLACK_THRESH = 0 defines the timing characteristic of the paths that will normally be identified as "critical" paths.

These instructions provide timing data for the preliminary model that is consistant with the assumption that devices in the model are allocated in an optimum fashion. This constraint on the initial allocation of timing data in the preliminary model provides more effective correction of all critical path timing, in that it prevents undue emphasis on the correction of paths which are temporarily far outside the required parameters after the initial assignment of the given technology to the blocks of the technology-independent model. Therefore $2000 \times 0.001$ picofarads is substuted for fan-out capacitance values greater than that maximum value, and all paths in which the actual arrival time does not at least satisfy the expected arrival time are treated as critical.

GTACALC ends the first section of Phase I by calculating all the actual and expected arrival times for the paths in this preliminary model. The critical paths within the preliminary model are then determined by the individual routines in the program, in accordance with the threshold parameters defined for the particular routine.

Paths where the expected time is earlier than the actual time are the paths where timing is generally considered to be "critical." That is, those paths where the difference is less than zero, in accord with the instruction "SET CRIT_SLACK_THRESH = 0". The relative criticality of the paths is defined by the slacks along the path, the difference between actual and expected times, as disclosed in U.S. Pat. No. 4,263,651 issued to Donath et al. on Apr. 21, 1981 and incorporated herein by reference.

Although many changes are likely to be made to the blocks in the model in the remainder of Phase I, this path analysis of the entire model is not performed again in Phase I. Because it is a very time-consuming process for large models, in the preferred embodiment shown in Table 1 it is performed only twice more: at the end of the legalization of the model in Phase II and after the implementation of the technology-legal model is complete, toward the end of Phase III.

In the second section of Phase I, after the critical path within the preliminary model produced from the technology-independent model has been preliminarily identified by GTACALC, based on the optimum allocation assumption, the program loops through GTAPROPC, GTAREDUN, GTAREDIN and GTAREDBY, to remove constant outputs, redundant gates and eliminate contradictory inputs. This loop is repeated in Phase III. However, two additional items are present in this loop in Phase I that do not reappear in Phase III because of the contraints imposed on time correction transformations in Phase III. These are GTACMPRS and GTAPREDC.

GTACMPRS increases fan-in by merging blocks having a fan-out of one with other blocks wherever possible. Thus GTACMPRS risks exceeding the maximum fan-in permitted in a given technology. For this reason GTACMPRS is repeated frequently in Phase I, to remove disposable blocks inserted by other routines, but GTACMPRS is not run at all after GTAFI at the beginning of Phase II.

GTAPREDC, on the other hand, may create fan-out violations, since it removes parallel blocks and those parallel blocks may have been added to correct fan-out violations. For this reason GTAPREDC is repeated again early in Phase II, to remove disposable blocks inserted by other routines, but GTAPREDC is not run at all after GTAFO at the end of Phase II.

These six routines are repeated in this loop until no further change is produced by repeating the loop. After each repeat of the loop a local recalculation of the timing data for the model is carried out in the preferred embodiment illustrated in FIG. 5, to update the timing data and to verify the location of the critical path in the model subsequent to the changes produced by each loop.

Figure 5:
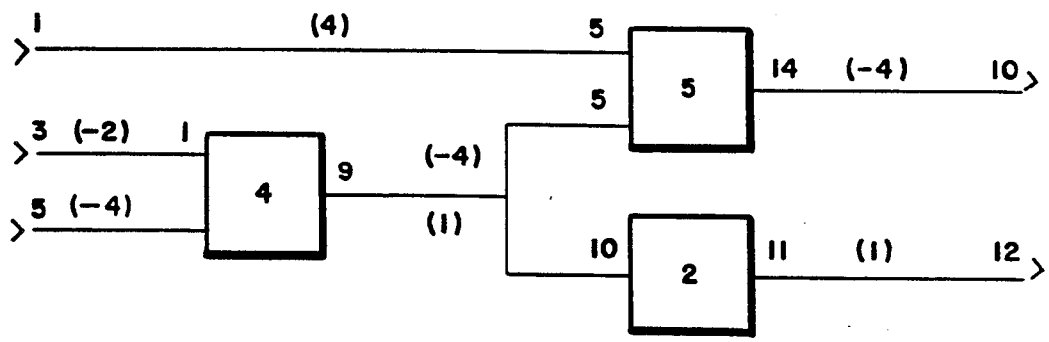
FIG. 5 illustrates local critical path recalculation in accordance with the preferred embodiment of the present invention.

The logic sequence in FIG. 5 flows from left to right. Block output actual arrival times are calculated by taking the latest output arrival time of its source blocks and adding the block delay which is shown inside each of the respective blocks. Similarly, block input expected arrival times are calculated by taking the earliest input expected arrival time of the subsequent blocks and subtracting the block delay.

Path slacks, given in parentheses in FIG. 5, are the difference between the input's expected arrival time at the right end of the respective path between blocks and the output's actual arrival time which is shown at the left end of the path. The critical path through the set of logic blocks shown in FIG. 5 is the path comprising elements that have respective slacks of minus four (−4) time units.

This data is not recalculated for the entire model after each routine. Instead, each time the model is modified by a routine, the timing data for the affected blocks is recalculated. Then the changed output actual arrival times are propagated along the effected paths until either the propagation produces no change, or the end of a path is reached. Similarly, the input expected arrival times effected by the modification of these blocks is propagated until either it makes no change in the data or until the start of a path is reached. This local recalculation is also done for each modification in the remainder of Phase I, and in Phases II and III, as part of the individual routines performed by the program.

The new routines appearing in the remainder of Phase I perform the following functions:

GTAPWRUP increases the power level of blocks in the critical path, where the speed of the critical path can be increased by the use of higher power levels for the allocated devices or devices having higher power requirements. For instance, a gate in the critical path that has a fan-in of two will be replaced by a gate with a fan-in of five that has a higher rate of power consumption if the larger gate, when only two of its inputs are used, is faster than the smaller one. GTAPWRUP provides a rough, technology-specific power level definition for the critical path that reduces the greatly exaggerated critical path delays produced by the low power levels assigned to all blocks by ASGNRULE. The exaggeration of these delays is reduced, however, without regard to fan-out violations that may result from the reallocation produced by the GTAPWRUP routine.

Figure 7:
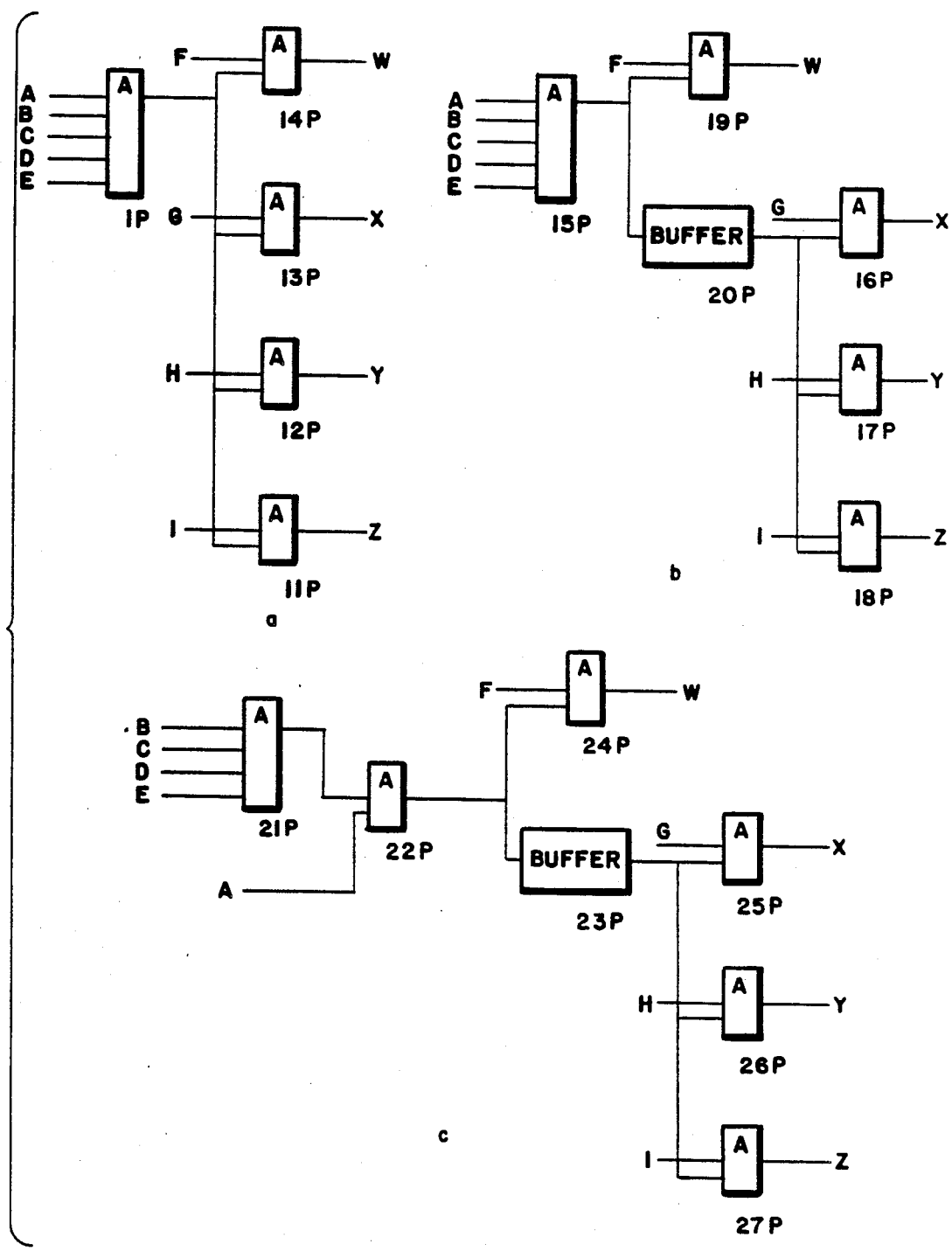
FIG. 7 illustrates the GTAREDFO and GTAREDFI steps in accordance with the present invention.

GTAREDFO reduces the effective fan-out load on a critical block by buffering the output connections serving loads that are less critical. In FIG. 7, the critical path connects input A with output W. In step (b) of FIG. 7, the non-critical paths of the signals output at X, Y, and Z shown in step (a) have been buffered to reduce the load on the first block in the critical path. This tends to correct fan-out violations on the buffered block, but risks producing fan-out violations on the buffer blocks themselves.

The first GTAREDFO parameter in parentheses is a threshold parameter, stated in 1/100ths nanoseconds of delay. This threshold parameter is added to the increase in path delay produced by a buffer in the given technology. The slack of paths to which buffers will be added must be greater than this sum. The second parameter is the number of passes through the logic that are used to identify eligible loads. GTAREDFO is first run early in the second section of Phase I in a highly restricted manner, with a threshold parameter of 700 so that it affects only a few, obviously correctible violations. It is run again, late in Phase II, where it has a threshold parameter of only 150 and, thus can fine-tune the critical path by reducing fan-out loads along the critical path.

Figure 9:
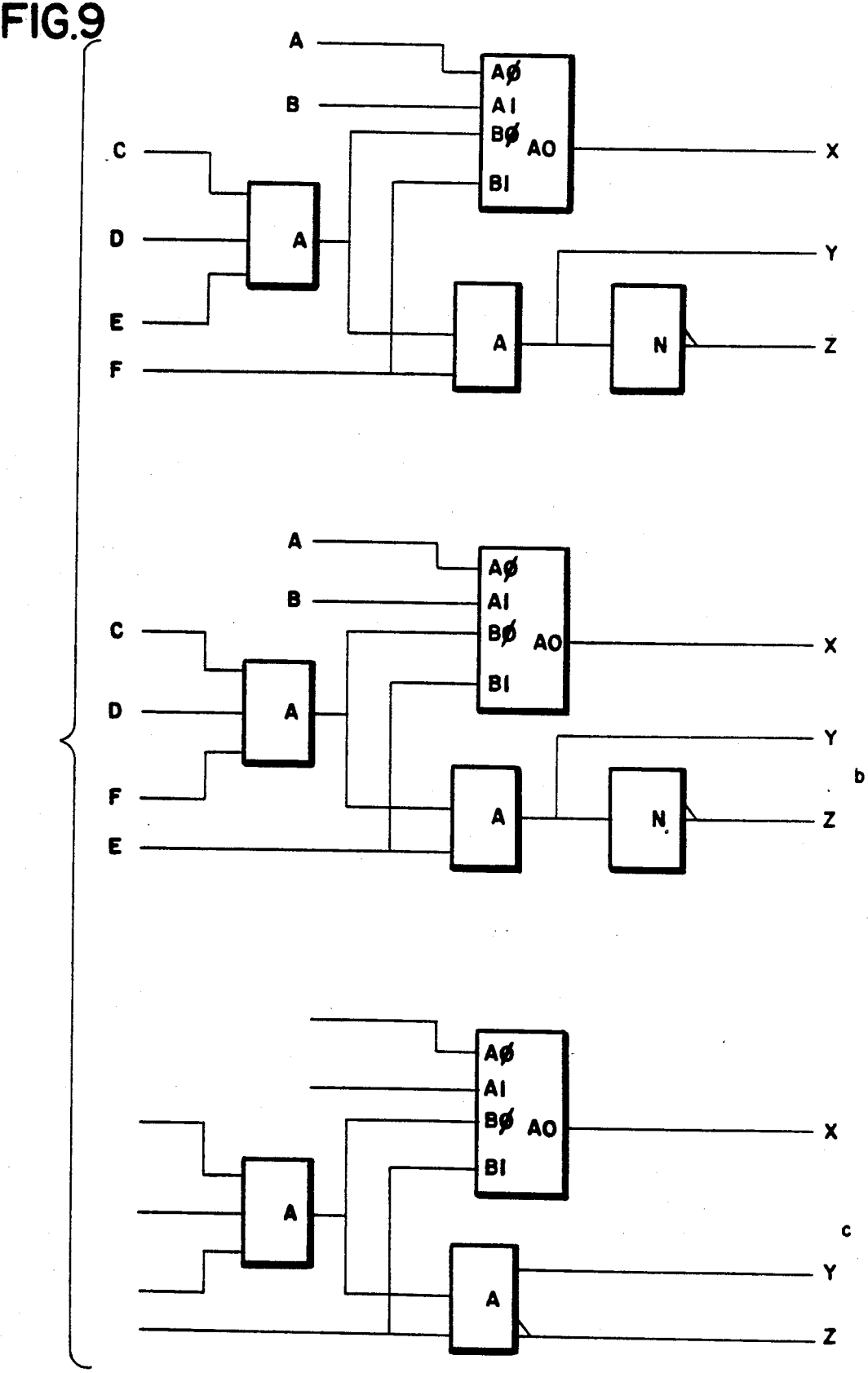
FIG. 9 illustrates the GTASIN and GTADUALR steps in accordance with the present invention.

GTADUALR makes use of dual rail devices where possible, if they benefit critical path speed. In FIG. 9, a dual rail AND block in step (c) is used to replace the combination of the AND block and the inverter block shown connected to outputs Y and Z in steps (a) and (b). Conversely, GTASINGR converts dual-rail devices to single-rail devices where they will benefit critical paths. GTASINGR is beneficial in CMOS technology, where single-rail devices are faster than the comparable dual-rail devices.

GTASINVT inverts primitive blocks' functions. GTASINVT then swaps a fan-out connection on an inverter in a critical path that is fed by that primitive block with the fan-out connection on that block that feeds devices that are less critical than those fed by the inverter. For example, in FIG. 6, the fan-out connection on the inverter producing signal "Z" in step (a) can be swapped with the fan-out connection of signal "Y" on the preceding AND block, if that preceding AND block is inverted to form a NAND block, as shown in step (c2). That NAND block is then added to the model in parallel with the existing AND BLOCK in step (c1). The parameter in parentheses is the number of passes through the model that will be made to identify eligible blocks.

GTATHRSH precedes GTASINVT to limit its action in Phase I. The parameters (50, 500) force GTASINVT to ignore eligible blocks that have slacks that are either less than 50% of the worst slack currently in the model or less than 5 nanoseconds. This reduces the time required for synthesis and prevents SINVT from making fine-tuning corrections at a time when they will likely be undone by other routines. The effect of GTATHRSH (50, 500) is then cancelled by SET CRIT_SLACK_THRSH=0 which follows the GTASINVT routine.

At this point, after the first use of GTASINVT, the routine GTACMPRS is repeated. Many other routines reappear again later in the program to counteract unintentional effects of changes made to the model after each of those routines were previously executed. The GTACMPRS routine, however, although it is repeated several times in Phase I, does not reappear after Phase I is complete because of the potentially disruptive effect on the legalization of the model noted above.

GTADEMOR applies DeMorgan's rule to transform blocks in the model where swapping a NAND for an OR or a NOR for an AND will reduce the number of inverters in the model, or make better use of faster alternative primitive functions. For example, in CMOS technology a NAND is faster than the equivalent OR block. Like GTASINVT, GTADEMOR is not run after GTAFO because it will remove inverters added by GTAFO for serial repowering.

The first GTADEMOR parameter in parentheses, stated in 1/100s nanoseconds, is added to the block slack to determine the threshold for the GTADEMOR operation. The slack for any eligible source must be greater than that sum to have an inverter added in its path by GTADEMOR. The second parameter is the number of passes that will be made through the model to identify eligible blocks.

Figure 10:
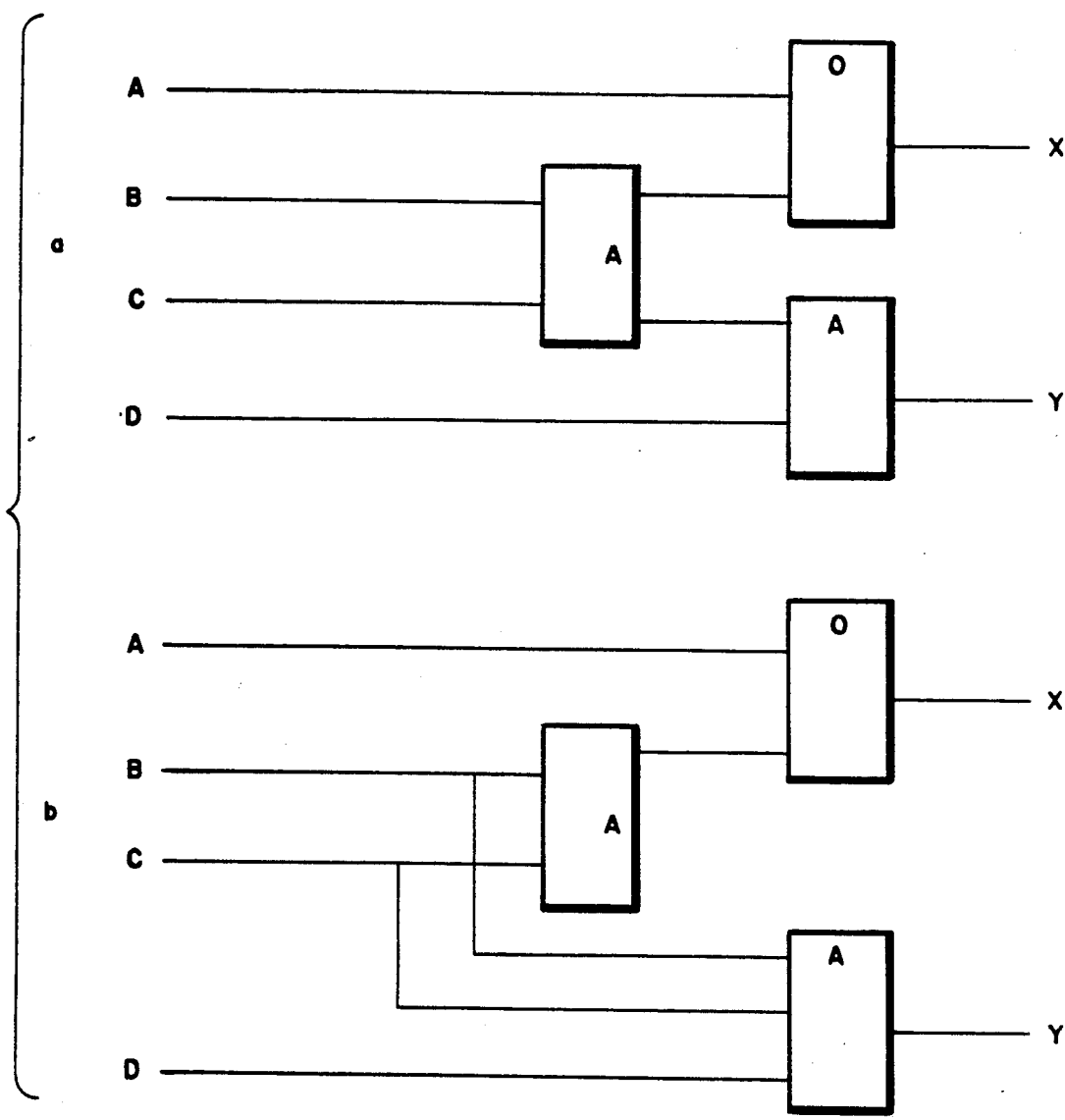
FIG. 10 illustrates the GTACAND step in accordance with the present invention.

GTACAND copies the inputs of critical AND blocks to subsequent critical blocks. Unlike GTACMPRS, this routine is not limited to blocks which have fan-outs of one. Also, GTACAND will only compress the fan-out for the most critical output path of the AND block. In FIG. 10, the two inputs B and C of a critical AND are copied to the subsequent AND block that produces output signal Y.

The other inputs of the subsequent block must have slacks greater than the sum of the slack of the critical path through the AND block plus the first parameter indicated in parentheses, which is stated in 1/100ths nanoseconds, for that AND block to be eligible for compression. The second number in parentheses for each routine is the number of passes made through the model to identify eligible blocks.

The GTACAND routine is preceded by a GTATHRSH (50, 400) statement that raises the threshold for critical slacks. This prevents GTACAND from greatly increasing the cell count of the model while performing its copy operation. That copy operation can produce fan-in violations at the blocks to which the critical inputs are copied, and fan-out load violations at the source of those inputs, which will require additional blocks.

Because GTACAND is likely to produce fan-in and fan-out violations, it is never run after GTAFI or GTAFO. GTAPROMO and GTASIN are used instead of GTACAND at that time, and do similar work with less likelihood of producing a technology violation.

GTACAO is similar to GTACAND, but it compresses AND-OR blocks. As in the case of GTACAND, the other outputs of the block must have slacks greater than the sum of the slack of the critical path through the AND-OR block plus the first parameter indicated in parentheses, which is stated in 1/100ths nanoseconds, for that AND-OR block to be eligible for compression. The second number in parentheses for each routine is the number of passes made through the model to identify eligible blocks.

GTABAO, in contrast to GTACAO, breaks relatively non-critical inputs off from AND-OR, AND-NOR, OR-AND, and OR-NAND blocks, like GTAREDFI. This routine is always run before GTACAO to increase the number of AND-OR blocks that are eligible for compression by GTACAO. The first GTABAO parameter in parentheses is the maximum number of critical inputs allowed in an eligible block. The second parameter, stated in 1/100ths nanoseconds, is added to the worst slack of any input to the block. Other inputs are non-critical if their slacks are greater than that sum.

GTAREGRP rearranges connections on selected blocks where delays differ widely depending on the pins assigned to a path, AND-OR gates for instance, so that the most critical path goes through the fastest pin combination.

GTAREDFI breaks out non-critical inputs while leaving the critical inputs. In contrast to GTAFI, GTAREDFI only reduces fan-in of blocks in the critical path. In FIG. 7 the critical path is the connection between input A and output W. In step (c) the non-critical inputs B, C, D, and E shown in steps (a) and (b) are broken off the first block in the critical path in step (c) and assigned to an additional AND block, which reduces the fan-in of the critical AND block.

The first parameter in parentheses is the maximum number of critical inputs that will be left and the second parameter is the minimum number of non-critical inputs that will be broken out by the GTAREDEFI routine. The third parameter, stated in 1/100ths nanoseconds, is added to the most critical slack among the input paths, and the paths having slacks greater than this sum are non-critical.

GTAFI marks the beginning of Phase II of the program, the legalization of the estimated model that has been optimized for critical path speed. GTAFI reduces fan-in of any block where the number of inputs to the block exceeds the number that the technology permits for the particular type of block.

GTAFIXOR reduces the fan-in of large, critical, exclusive-OR blocks or parity blocks. Generally, these blocks have significant delay. The first parameter in parentheses is the minimum fan-in of the exclusive-OR that is eligible for this operation. The second parameter is the maximum fan-in allowed in the new exclusive-ORs added by this transformation.

Figure 6:
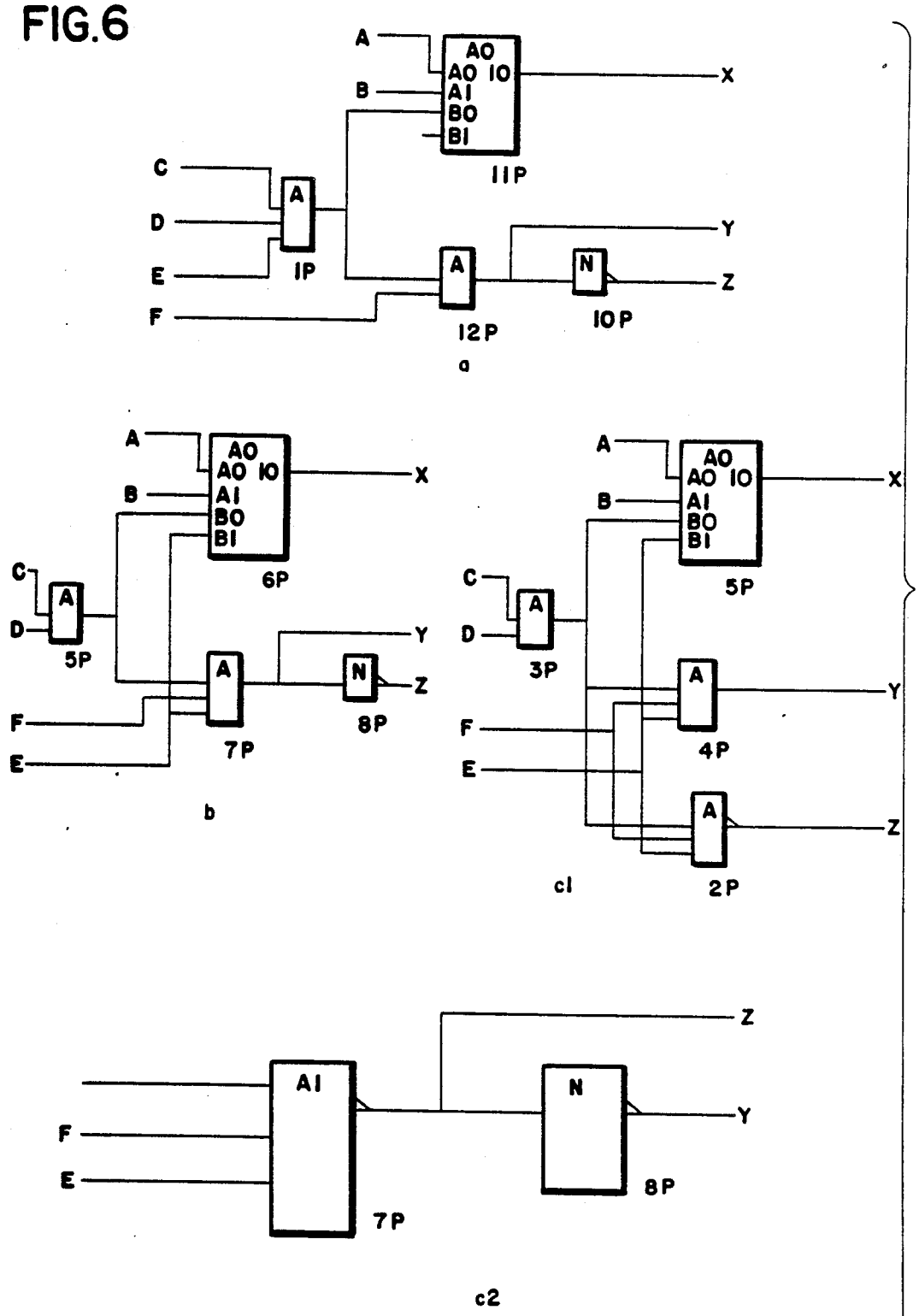
FIG. 6 illustrates the GTAPROMO, GTAMINVT, and GTASINVT steps in accordance with the present invention.

GTAMINVT, in contrast to GTASINVT, which precedes GTAMINVT here, generates a new block in parallel to that primitive but with the inverse function and then moves the fan-out tree of the inverter to the new block. In FIG. 6, the inverter producing signal "Z" in step (a) is merged with the preceding AND block to form a NAND block. That NAND block is then added to the model in parallel with the existing AND BLOCK in step (c1). Alternatively, the fan-out connection on the inverter producing signal "Z" in step (a) can be swapped with the fan-out connection of signal "Y" on the preceding AND block, if that preceding AND block is inverted to form a NAND block, as shown in step (c2). That NAND block is then added to the model in parallel with the existing AND BLOCK in step (c1). In each instance, the parameter in parentheses is the number of passes made through the model to identify eligible blocks.

GTAUNBUF removes buffering from critical paths. The parameter in parentheses is the number of passes through the logic used to identify eligible buffers. Although this is a fine-tuning procedure that will have to be repeated later, it is not particularly time-consuming since it runs only two passes through the model and it improves the reliability of the subsequent GTACALC timing calculation.

Figure 8:
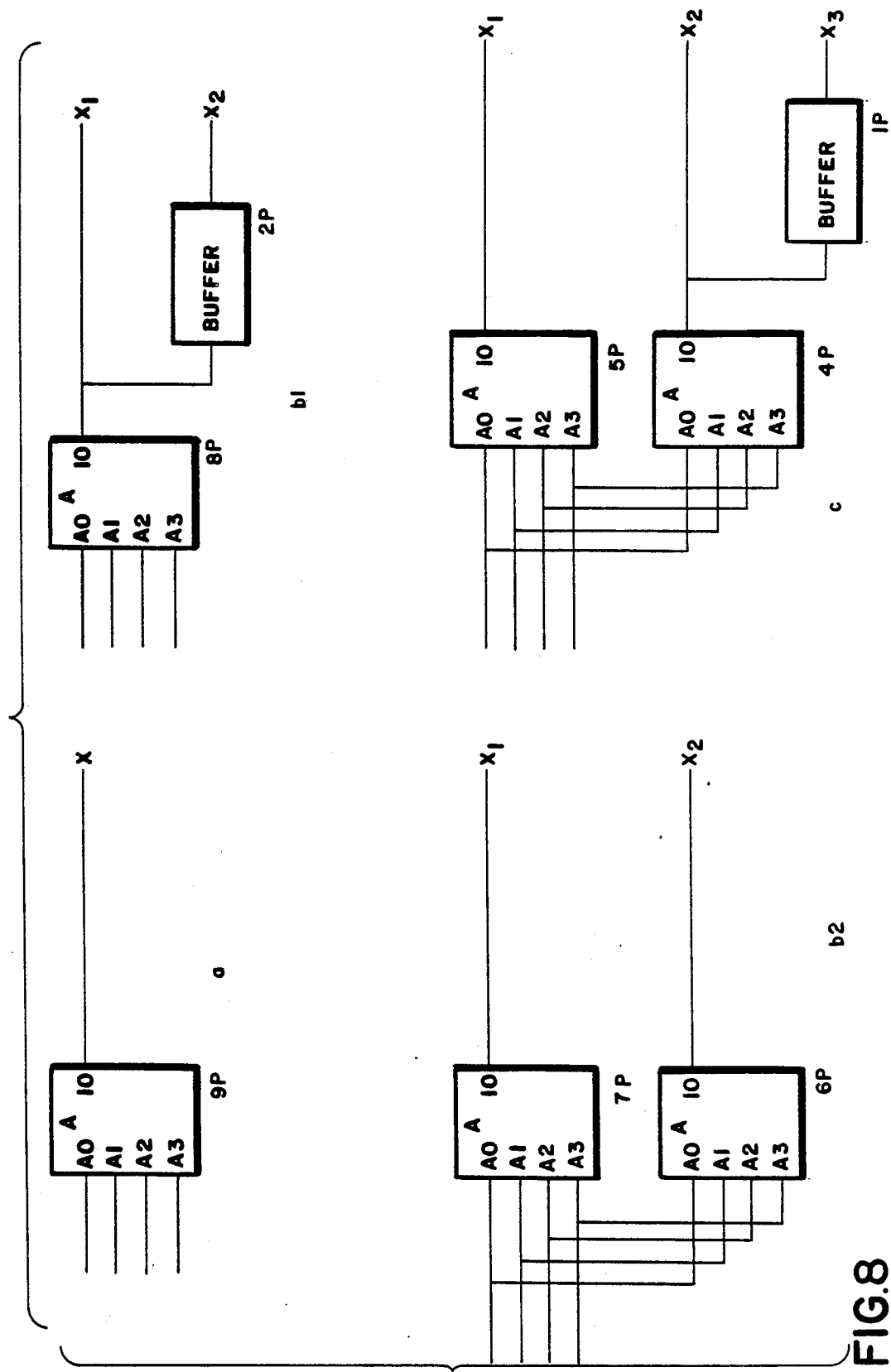
FIG. 8 illustrates the GTAFO step in accordance with the present invention.

GTAFO reduces fan-out in two ways: either by serial repowering, which distributes excess load by assigning non-critical outputs to buffer blocks, or by parallel repowering, which copies the block and shifts the excess load to the copy. In FIG. 8, output X carries a load that violates the fan-out limits of the block shown in step (a). In steps (b1) and (b2) the fan-out violation has been corrected by serial and parallel repowering, respectively, which connect both X1 and X2 to the load. In step (c) serial and parallel repowering have been combined, so the X1, X2, and X3 are all connected to the load, to reduce the output load still further. The parameter, stated in 1/100ths nanoseconds is the slack threshold above which fan-out will be allowed to exceed normal limits.

Because the transform GTASINVT would remove the inverters added by GTAFO for serial repowering, it is not used after GTAFO. Similarly, GTADUALR and GTASINGR delete and add inverters to blocks that have both positive and negative outputs, and are not used after GTAFO. GTAMINVT duplicates blocks rather than removing inverters, but it may produce fan-out violations because the additional block adds to the load carried by the blocks that precede the duplicate block. GTAMINVT, also, is not run after GTAFO.

The GTAUNBUF routine will undo buffering added to critical paths by GTAFO. However, it is coded so that it will not act where its action would produce a technology violation. Thus it is self limiting and, unlike GTASINVT, GTADUALR, GTASINGR and GTAMINVT, can be run late in the fine-tuning performed by the first section of Phase III in the program.

SET MAXFO999999, which follows GTAFO, removes the maximum limit previously set on fan-out values by the instruction SET MAXFO (2000). This permits subsequent delay calculations to use actual delay values for all blocks. GTACALC then ends Phase II with a complete recalculation of the delay times in the model based on the actual devices assigned to the blocks of the technology-independent model in the steps completed to this point.

The new routines that appear in Phase III fine-tune the technology mapping that has been made in phase II and the optimization of the critical path done in phase I. These new routines are:

GTAFOBAL rearranges the fan-out connections of blocks in the model to improve the performance of those blocks by balancing their fan-out loads. It moves fan-out connections to equivalent output locations, locations suitable for critical or non-critical connections, respectively, and the balancing effectively reduces the maximum fan-out left by GTAFO.

GTAPROMO shortens the path of a single critical signal by removing a block from its path, as shown in FIG. 6. In FIG. 6 critical signal path "E" shown in step (a) as passing through three blocks has been promoted in step (b) by removing an AND block from the path, so that it passes through only two blocks. This is similar to GTACAND but only one signal is affected and all subsequent blocks in the path are affected, rather than all signals being affected that pass through selected blocks.

The routine GTAPROMO is suitable for use in the fine-tuning done by the first section of Phase III for two reasons. First, GTAPROMO is not run until Phase III, after the model has been both legalized and optimized for the speed of the critical path. Thus few opportunities for shortening the path of a critical signal will be found. This minimizes the routine's effect on fan-out along those paths. Second, GTAPROMO is coded so that no action will be taken if the action will produce a fan-in violation.

The first two parameters that follow GTAPROMO, stated in 1/100ths nanosecond, are the threshold parameters for normal blocks and for exclusive-OR blocks, respectively, which are added to the slack of a candidate path. All other slacks for the subsequent block must have values greater than the sum of the slack of the candidate path and the threshold value. The third parameter in the parentheses is the number of passes through the logic that are used to identify eligible paths.

Because GTAPROPC, GTAREDUN, GTAREDIN, and GTAREBY merely propagate constants and remove redundant logic, their chance of producing a technology violation is small. GTAREGRP also only swaps connections within a block. Thus these routines are run after GTAPROMO to clean up before the final application of GTAFI.

However, since there is a slight chance that GTAREGRP will produce fan-out violations in preceding blocks while moving inputs from pin to pin if those pins have different load values, the threshold values GTATHRSH (50, 100) are set lower than they were in Phase II, GTATHRSH (70, 300). This further limits the action of GTAREGRP.

GTASIN swaps input connections. Instead of only promoting a connection forward, one connection is promoted by the swap and the other is demoted, as shown in FIG. 9. The GTASIN routine is limited in that the output of the block to which non-critical input F is demoted must be connected only to the blocks to which the critical output E shown in step (a) is promoted in step (b). Thus, although GTASIN is somewhat like GTAPROMO, it is even less likely to produce a fan-out violation. The parameter in parentheses is the number of passes through the model that are used to identify eligible blocks.

GTACELDN and GTAPWRUP are closely related. GTACELDN selects technology blocks with minimum area and power requirements for non-critical blocks. This eliminates the GTAPWRUP power increases affecting non-critical blocks. GTAREPWR optimizes the performance of critical blocks, by fine-tuning the device and power level allocations provided for these blocks by GTAPWRUP. The GTAPWRUP parameter in parentheses, stated in 1/100ths nanosecond, is the minimum improvement that must be effected if the action of GTAPWRUP will increase cell count. Both are coded so that they do not act if their action will produce a technology violation.

GTAFILL and GTASLOW are also somewhat similar in their effect on timing and allocation. GTAFILL adds inputs tied to constants where the technology requires more inputs for a particular block. GTASLOW adds delay to paths which are too short, to prevent the timing errors that are produced when signals arrive at a block to early in a clock cycle. Both have little effect on critical paths. GTASLOW increases neither fan-in nor fan-out allocations. GTAFILL only supplies inputs tied to constant signals, only inputs that are necessary to satisfy the technology's requirements. Thus GTAFILL, also, has little effect on timing and does not change allocation.

RCHTOTEC supplies the detailed specification for the devices that have been mapped onto the technology-independent model, after the final GTAFO routine has been performed, in preparation for the final complete recalculation of the path delays in the final, technology-legal hardware implementation of the model. GTACALC then provides a final recalculation of the slacks for the model.

GTAHISTO then graphs the resulting slacks, and GTASLIST lists the worst slacks for each device order of diminishing delay. Finally, GTAIODE removes the dummy blocks added by GTACIOAD and the program ends.

This invention is defined by the appended claims. However, it will be apparent to one skilled in the art that modifications and variations can be made within the spirit and scope of the present invention. In particular, the specific number and character of the transformations used in this logic synthesis method may vary considerably while still providing the estimation and legalization of a hardware implementation for the technology-independent model in accordance with the present invention.

TABLE 1

Data Types

```
/****************************************************/
/* Data Types                                       */
/****************************************************/
Type SideType    = (User, Provider);      /* Type of CCB */
Type CCB         = @CCBRecord;            /* References a CCB */
Type TieGroupPtr = @TieGroup;     /* References a TieGroup */
Type EdgePtr     = @Edge;   /* References a TieGroup edge */

/****************************************************/
/* Connection Control Block - Relevant Pieces       */
/****************************************************/
Type CCBRecord = Record
    Use        : SideType;
                    /* Use of block, U-side or P-side      */
    TieGroup   : TieGroupPtr;
                    /* TieGroup this CCB belongs to        */
    FirstEdge  : EdgePtr;      /* 1st edge in TieGroup     */
    NextInTie  : CCB;          /* Next block in TieGroup   */
    NextCCB    : CCB;          /* Next CB on CCB chain     */
  End;

/****************************************************/
/* Tie Group Control Block - Relevant Pieces        */
/****************************************************/
Type TieGroup = Record
    TiedCBs    : EdgePtr;      /* Tied CCB edges list      */
    FirstInTie : CCB;          /* First CCB in TieGroup    */
    LastInTie  : CCB;          /* Last CCB in TieGroup     */
  End;

/****************************************************/
/* Tie Group Edge Control Block                     */
/****************************************************/
Type Edge = Record
    TieBlk : TieGroupPtr; /* TieGroup associated with      */
    USide  : CCB;         /* CCB Pointer of the tied UCCB  */
    PSide  : CCB;         /* CCB Pointer of the tied PCCB  */
    NextU  : EdgePtr;   /* Next edge containing this UCCB  */
    NextP  : EdgePtr;   /* Next edge containing this PCCB  */
    Next   : EdgePtr;     /* Next edge in same TieGroup    */
    Prev   : EdgePtr;     /* Prev edge in same TieGroup    */
  End;
```

TABLE 2

The Tie Algorithm

```
/****************************************************/
/* FORMAL CALL:                                     */
/* Procedure Tie  (UCCB:  CCB;        User CCB to tie    */
/*                 PCCB:  CCB);       Provider CCB to tie */
/*                                                  */
/* FUNCTION:                                        */
/* Ties two CCBs together                           */
/*                                                  */
/* ASSUMPTIONS:                                     */
/* 1.  UCCB and PCCB are not already tied           */
/* 2.  UCCB is a User CCB, and PCCB is a Provider CCB */
/* 3.  We are in a single tasking environment       */
/****************************************************/
Procedure Tie  (UCCB:  CCB;         /* User CCB to tie    */
                PCCB:  CCB);        /* Provider CCB to tie */

Var OldTieGroup : TieGroupPtr;

Begin
  /* If both CBs belong to the same tie group, then all  */
  /* we need do is add another edge to this TieSerial    */
  /* block                                               */
  If UCCB@.TieGroup = PCCB@.TieGroup then
    InsertAnEdge
  else
    begin
      InsertAnEdge;       /* Create and chain in new edge */
      OldTieGroup := PCCB@.TieGroup;
                          /* Save address to old tie group */
      JoinTieGroups;      /* Join the two edge chains    */
      FreeStorage (OldTieGroup);
                          /* OldTieGroup no longer needed */
    end;
End;

/****************************************************/
/* FUNCTION:  Create a new edge entry for these two CCBs */
/*            in the UCCB's tie group               */
/****************************************************/
Procedure InsertAnEdge;

Var NewEdge:  EdgePtr;
Begin                              /* Allocate a new edge */
  GetStorage (NewEdge);
  With NewEdge@ do
    begin     /* Point back to the owning Tie Serial block */
      TieBlk := UCCB@.TieGroup;
        /* Set up the USide, PSide, NextP, NextP sides   */
        /* appropriately. Note that all list entries are */
        /* done at the front of the list.                */
      USide  := UCCB;
      PSide  := PCCB;
```

```
      NextU    := UCCB@.FirstEdge;
      NextP    := PCCB@.FirstEdge;
        /* Lastly, chain in this initialized edge into    */
        /* the TieGroup block list, the FirstTied in the  */
        /* UCCB side, and the FirstTied in the PCCB side  */
      Next     := TieBlk@.TiedCBs;
      Prev     := Nil;
      If Next <> Nil then                /* Note first Edge */
        Next@.Prev       := NewEdge;
      TieBlk@.TiedCBs  := NewEdge;
      UCCB@.FirstEdge  := NewEdge;
      PCCB@.FirstEdge  := NewEdge;
    end;
end;

/*****************************************************/
/* FUNCTION:  Join two disjoint tie groups via the Edge  */
/*            lists                                      */
/*****************************************************/
Procedure JoinTieGroups;

Var
   CurrCB    : CCB;              /* Current CCB in search  */
   CurrEdge  : EdgePtr;          /* Current Edge in search */

Begin
   /* Join the two Edge lists.  PCCB edge list is placed  */
   /* at the end of UCCB edge list                        */
   UCCB@.LastInTie@.NextInTie := PCCB@.FirstInTie;
   UCCB@.LastInTie            := PCCB@.LastInTie;
     /* Now scan the edge list for PCCB and change all of */
     /* its members to point to UCCB's TieGroup           */
   CurrCB                     := PCCB@.FirstInTie;
   Repeat
     CurrCB@.TieGroup         := UCCB@.TieGroup;
     CurrCB                   := CurrCB@.NextInTie;
   Until CurrCB = Nil;
     /* Next, chain the two edge lists together.  This   */
     /* completes the joining of the ties.               */
   If PCCB@.TieGroup@.TiedCBs <> Nil then
     begin
       CurrEdge := UCCB@.TieGroup@.TiedCBs;
       While CurrEdge@.Next <> Nil do
         CurrEdge := CurrEdge@.Next;
       CurrEdge@.Next       := PCCB@.TiedCBs;
       CurrEdge@.Next@.Prev := CurrEdge;
         /* Finally, change all the edges addes to point  */
         /* to the correct TieGroup                       */
       While CurrEdge <> Nil do
         begin
           CurrEdge@.TieBlk := UCCB@.TieGroup;
           CurrEdge         := CurrEdge@.Next;
         end;
     end;
end;
```

TABLE 3

The Untie Algorithm

```
/*****************************************************************/
/* FORMAL CALL:                                                  */
/* Procedure UnTie   (UCCB:  CCB;     User side of tie           */
/*                    PCCB:  CCB);    Provider side of tie       */
/*                                                               */
/* FUNCTION:                                                     */
/* UnTies two CCBs from a TieGroup, and determines if two        */
/* TieGroups need to be created.                                 */
/*                                                               */
/* ASSUMPTIONS:                                                  */
/* 1.   UCCB and PCCB are tied                                   */
/* 2.   UCCB is a User CCB, and PCCB is a Provider CCB           */
/* 3.   We are in a single tasking environment                   */
/*****************************************************************/
Procedure UnTie   (UCCB:  CCB;      /* User side of tie        */
                   PCCB:  CCB);     /* Provider side of tie    */

Var Tied : EdgePtr;                 /* Edge representing CCBs  */

Begin
   Tied := EdgePtr which represents edge between UCCB and
           PCCB;
     /* Get rid of the edge that joins these two CCBs           */
   DeleteEdge;
     /* Determine if we now have two sets of ties and           */
     /* should create another tie group                         */
   MakeDisjointTies;
     /* At this point, the two CCBs are untied, and two         */
     /* separate tie groups may have been formed                */
End;

/START OF PROCEDURE/FUNCTION COMMENT******************/
/* FUNCTION:  Delete an edge from the tie group           */
/*********************************************************/
Procedure DeleteEdge;

Var CurrEdge:  EdgePtr;             /* Current Edge in search  */
Begin                               /* Unchain Tied from UCCB TieGroup */
   If Tied@.Prev = Nil then
     UCCB@.TieGroup@.TiedCBs := Tied@.Next
   else
     Tied@.Prev@.Next := Tied@.Next;
   If Tied@.Next <> Nil then
     Tied@.Next@.Prev := Tied@.Prev;
      /* Unchain Tied from the UCCB TieEdge Chain             */
   If UCCB@.TieGroup@.FirstEdge = Tied then
     UCCB@.TieGroup@.FirstEdge := Tied@.NextU
   else
     begin
       CurrEdge := UCCB@.TieGroup@.FirstEdge;
       While CurrEdge@.NextU <> Tied to
         CurrEdge := CurrEdge@.NextU;
```

```
        CurrEdge@.NextU := Tied@.NextU;
      end;
         /* Unchain Tied from the edge lists from the PCCB    */
    If PCCB@.TieGroup@.FirstEdge = Tied then
      PCCB@.TieGroup@.FirstEdge := Tied@.NextP
    else
      begin
        CurrEdge := PCCB@.TieGroup@.FirstEdge;
        While CurrEdge@.NextP <> Tied do
          CurrEdge := CurrEdge@.NextP;
        CurrEdge@.NextP := Tied@.NextP;
      end;
         /* Tied is now no longer chained anywhere, so free    */
         /* it                                                 */
    FreeStorage(Tied);
end;

/START OF PROCEDURE/FUNCTION COMMENT******************/
/* FUNCTION:  Attempt to split the tie group into two     */
/*            disjoint groups                             */
/**********************************************************/
Procedure MakeDisjointTies;

Var
  OldGroup : TieGroupPtr;          /* Original Serial block */
  NewGroup : TieGroupPtr;          /* New Serial block      */
Begin
  OldGroup := CBu@.TieGroup;
     /* Create New TieGroup, and initialize NewGroup       */
     /* fields                                             */
  GetStorage(NewGroup);
  NewGroup@.TiedCBS    := Nil;
  NewGroup@.FirstInTie := Nil;
  NewGroup@.LastInTie  := Nil;
  If UCCB@.FirstTie = Nil then  /* UCCB completely untied  */
    UCCB@.TieGroup := NewGroup
  else if PCCB@.FirstTie = Nil then
    /* PCCB completely untied                              */
    PCCB@.TieGroup := NewGroup
  else                          /* Possibly two tie groups */
    MakeDisjointSets;
       /* At this point, we are guaranteed to have two     */
       /* tiegroups.  Each group will have at least one    */
       /* CCB in it, although both tiegroups may have no   */
       /* edges.                                           */
  SplitTieList;                 /* Fix the tie group lists */
  If OldGroup@.FirstInTie = Nil then
     /* Free Old tie group if empty                        */
     FreeStorage (OldGroup);
end;

/START OF PROCEDURE/FUNCTION COMMENT******************/
/* FUNCTION:  Move all edges that belong in one group to  */
/*            the new tie group                           */
/**********************************************************/
Procedure MakeDisjointSets;

Var CurrEdge : EdgePtr;          /* Current edge in OldGroup */
```

```
Begin         /* Move First TiePair from OldGroup to NewGroup */
  MoveEdge (OldGroup, NewGroup, OldGroup@.TiedCBs);
    /* Move all of the first tiepair-like Usides and like */
    /* Psides in                                          */
  CurrEdge := NewGroup@.TiedCBs;
  MoveSide (OldGroup, NewGroup, CurrEdge@.Uside@.FirstEdge,
          User);
  MoveSide (OldGroup, NewGroup, CurrEdge@.Pside@.FirstEdge,
          Provider);
    /* Continually walk down the OldGroup edge chain,     */
    /* moving over those edges that contain a match in    */
    /* NewGroup.  We're done when we reach the end of     */
    /* TiedCBs                                            */
  CurrEdge := OldGroup@.TiedCBs;
  While CurrEdge <> Nil do
    If EdgeMatchFound (CurrEdge, NewGroup) then
      begin
        MoveSide (OldGroup, NewGroup,
              CurrEdge@.Pside@.FirstEdge, Provider);
        CurrEdge := OldGroup@.TiedCBs;
      end
    else
      CurrEdge := CurrEdge@.Next;
end;

/START OF PROCEDURE/FUNCTION COMMENT******************/
/* FUNCTION:  Move either all the User Sides or Provider */
/*            Sides associated to a just-moved edge to   */
/*            the new tie group                          */
/*********************************************************/
Procedure MoveSide (OldGroup : TieGroupPtr;
                    NewGroup : TieGroupPtr;
                    CurrEdge : EdgePtr;
                    Side     : BlockUse);

Begin                       /* Move all of the like edges over */
  While CurrEdge <> Nil do
    begin
      MoveEdge (OldGroup, NewGroup, CurrEdge);
        /* Get next edge to be moved                    */
      If Side = User then
        CurrEdge := CurrEdge@.NextU
      else
        CurrEdge := CurrEdge@.NextP;
    end;
end;

/START OF PROCEDURE/FUNCTION COMMENT******************/
/* FUNCTION:  Move a single edge from OldGroup to        */
/*            NewGroup and adjust all chains accordingly */
/*********************************************************/
Procedure MoveEdge (OldGroup : TieGroupPtr;
                    NewGroup : TieGroupPtr;
                    CurrEdge : EdgePtr);
Begin        /* Take this edge out of the OldGroup chain */
  If CurrEdge@.Prev = Nil then
    begin
```

```
      OldGroup@.TiedCBs := CurrEdge@.Next;
      If OldGroup@.TiedCBs <> Nil then
        OldGroup@.TiedCBs@.Prev := Nil;
    end
  else
    begin
      CurrEdge@.Prev@.Next := CurrEdge@.Next;
      If CurrEdge@.Next <> Nil then
        CurrEdge@.Next@.Prev := CurrEdge@.Prev;
    end;
      /* Make this edge and its CCBs owned by NewGroup,   */
      /* then chain this edge into the front of NewGroup  */
  CurrEdge@.TieBlk              := NewGroup;
  CurrEdge@.USide@.TieGroup     := NewGroup;
  CurrEdge@.PSide@.TieGroup     := NewGroup;
  CurrEdge@.Next                := NewGroup@.TiedCBs;
  CurrEdge@.Prev                := Nil;
  NewGroup@.TiedCBs             := CurrEdge;
  If CurrEdge@.Next <> Nil then
     CurrEdge@.Next@.Prev := CurrEdge;
end;

/START OF PROCEDURE/FUNCTION COMMENT******************/
/* FUNCTION:  See if an Edge match has been found        */
/*********************************************************/
Function EdgeMatchFound (CurrEdge : EdgePtr;
                         TieBlk   : TieGroupPtr) : Boolean;

Begin
  /* TieBlk is the address of the NEW TieGroup that      */
  /* everything is getting moved to.  CurrEdge is the    */
  /* edge just pulled off the Old TieGroup edge chain    */
  If (CurrEdge@.USide@.TieGroup = TieBlk) or
     (CurrEdge@.PSide@.TieGroup = TieBlk) then
    EdgeMatchFound := True
  else
    EdgeMatchFound := False;
end;

/START OF PROCEDURE/FUNCTION COMMENT******************/
/* FUNCTION:  Split the tie group chain                  */
/*********************************************************/
Procedure SplitTieList;

Var
  CurrCB : CCB;                  /* Current CCB in search  */
  PrevCB : CCB;                  /* Previous CCB in search */
Begin
  CurrCB := OldGroup@.FirstInTie;
  PrevCB := Nil;
    /* Exhaustive search of old tie group membership list */
  While CurrCB <> Nil do
    begin
      /* CCB should be put in the NewGroup Tie list if   */
      /* its TieGroup has been changed to NewGroup       */
      If CurrCB@.TieGroup = NewGroup then
        begin
          /* If this is not the first in tie list, adjust */
```

```
    /* middle of list                                         */
    If PrevCB <> Nil then
      begin
        PrevCB@.NextInTie := CurrCB@.NextInTie;
          /* Check to see if this was the end of              */
          /* the list                                         */
        If OldGroup@.LastInTie = CurrCB then
          OldGroup@.LastInTie := PrevCB;
      end
        /* Otherwise, adjust the front of the list            */
    else
      OldGroup@.FirstInTie := CurrCB@.NextInTie;
        /* For empty NewGroup tie list, make Last-            */
        /* and First-InTie the same. After that,              */
        /* put all new CBs in the front so that               */
        /* LastInTie never changes again                      */
    If NewGroup@.FirstInTie = Nil then
      begin
        NewGroup@.LastInTie := CurrCB;
        CurrCB@.NextInTie   := Nil;
      end
    else
      CurrCB@.NextInTie := NewGroup@.FirstInTie;
      NewGroup@.FirstInTie := CurrCB;
        /* Move to the next CCB in the old tie list           */
    If PrevCB <> Nil then
      CurrCB := PrevCB@.NextInTie
    else
      CurrCB := OldGroup@.FirstInTie;
    end /* No changes for this CB, move to the next           */
  else
    begin
      PrevCB := CurrCB;
      CurrCB := CurrCB@.NextInTie;
    end;
  end;
end;
```

What is claimed is:

1. A method of logic synthesis that avoids producing the uncorrectable timing problems that are encountered when rules for a given technology are assigned to a technology independent logic model, said given technology having a prescribed set of available functional logic blocks, said method comprising the steps of:
   (a) identifying logic blocks in the model that are not available in said given technology;
   (b) estimating the timing characteristics of said logic blocks that are not available in said given technology based upon the characteristics of similar logic blocks that are available, thereby providing a preliminary model;
   (c) calculating the timing values for the preliminary model using fan-out values that are limited to a predetermined maximum load;
   (d) applying timing correction routines to the critical path in the preliminary model, thereby providing an estimated model; and
   (e) correcting violations of the rules of said given technology in the estimated model, thereby providing a technology-legal model.

2. The method of claim 1 further comprising the step of locally recalculating slacks in the model after a correction is made.

3. The method of claim 1 further comprising the step of providing adjusted average delay times for selected blocks in the model for use in timing value calculations.

4. The method of claim 1 further comprising the step of forcing a timing correction routine to ignore selected eligible blocks in the model when making timing corrections in the model.

5. Apparatus for producing logic synthesis by assigning rules for a given technology to a technology-independent logic model while avoiding uncorrectable timing problems, said given technology having a prescribed set of available functional logic blocks, said apparatus comprising:
   (a) means for identifying logic blocks in the model that are not available in said given technology;

(b) means for estimating the timing characteristics of said logic blocks that are not available in said given technology based upon the characteristics of similar logic blocks that are available, thereby providing a preliminary model;

(c) means for calculating the timing values for the preliminary model using fan-out load values that are limited to a predetermined maximum load;

(d) means for applying timing correction routines to the critical path in the preliminary model, thereby providing an estimated model; and (e) means for correcting violations of the rules of said given technology in the estimated model, thereby providing a technology-legal model.

6. The apparatus of claim 5 further comprising means for locally recalculating slacks in the model after a correction is made.

7. The apparatus of claim 5 further comprising means for providing adjusted average delay times for selected blocks in the model for use in timing value calculations.

8. The apparatus of claim 5 further comprising means for forcing a timing correction routine to ignore selected eligible blocks in the model when making timing corrections in the model.

* * * * *